（12）United States Patent
Michaud et al.

(10) Patent No.: US 10,542,120 B2
(45) Date of Patent: Jan. 21, 2020

(54) WIRELESSLY PROVIDING OPERATING SYSTEM SPECIFIC FEATURES

(71) Applicant: Microsoft Technology Licensing, LLC, Redmond, WA (US)

(72) Inventors: Alain L. Michaud, Boischatel (CA); Raymond Yat Ming Yip, Kirkland, WA (US); Wei Tao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 15/428,919

(22) Filed: Feb. 9, 2017

(65) Prior Publication Data

US 2018/0131787 A1  May 10, 2018

Related U.S. Application Data

(60) Provisional application No. 62/420,396, filed on Nov. 10, 2016.

(51) Int. Cl.
*H04L 29/08* (2006.01)
*H04W 4/80* (2018.01)

(52) U.S. Cl.
CPC ............. *H04L 67/34* (2013.01); *H04W 4/80* (2018.02); *H04L 67/303* (2013.01)

(58) Field of Classification Search
CPC .......... H04W 4/80; H04L 67/30; H04L 67/34; G06F 9/54
See application file for complete search history.

(56) References Cited

U.S. PATENT DOCUMENTS

| 8,959,267 B2 | 2/2015 | Kang et al. |
| 9,189,358 B2 | 11/2015 | Cho |
| 2005/0221894 A1 | 10/2005 | Lum et al. |
| 2006/0136893 A1* | 6/2006 | Blossom ................. G06F 8/60 717/168 |

(Continued)

FOREIGN PATENT DOCUMENTS

WO     2007084958 A1     7/2007

OTHER PUBLICATIONS

"Logitech Bluetooth Multi-Device Keyboard K380 Setup Guide", http://www.logitech.com/en-in/manuals/k380-setup-guide, Published on: Sep. 8, 2015, 9 pages.

(Continued)

*Primary Examiner* — Kim T Nguyen
(74) *Attorney, Agent, or Firm* — Holzer Patel Drennan

(57) ABSTRACT

An example system for wirelessly providing operating system specific features includes memory and a processor configured to send a device identifier (DID) request to a remote host device via a wireless connection. The processor is to also receive remote host information from the remote host device via the wireless connection. Additionally, the processor is to detect an operating system of the host remote device based on the received remote host information. The processor is to further modify an operation of the system based on the detected operating system of the remote host device. The processor is to then provide, via the wireless connection, an operating system specific feature based on the detected operating system of the remote host device.

21 Claims, 5 Drawing Sheets

(56) References Cited

U.S. PATENT DOCUMENTS

| | | |
|---|---|---|
| 2009/0217304 A1* | 8/2009 | Shih .................... G06F 9/4411 719/321 |
| 2012/0297341 A1 | 11/2012 | Glazer et al. |
| 2013/0300647 A1* | 11/2013 | Drasnin ............... G06F 9/4415 345/156 |
| 2014/0273855 A1 | 9/2014 | Jang |
| 2016/0014545 A1 | 1/2016 | Tian et al. |
| 2016/0062923 A1 | 3/2016 | Holzbecher et al. |
| 2016/0127516 A1* | 5/2016 | Chazot ................... H04L 69/18 710/11 |

OTHER PUBLICATIONS

"8bitdo ZERO Instruction Manual", http://web.archive.org/web/20151011233146/http://www.8bitdo.com/zero/Manual.html, Published on: Oct. 11, 2015, 3 pages.

"ipega Extending Game Controller", http://web.archive.org/web/20160816180249/http:/esynic.com/instruction/KB036.pdf, Published on: Aug. 16, 2016, 2 pages.

Herfurt, et al., "Remote Device Identification based on Bluetooth Fingerprinting Techniques", In White Paper of Blueprinting, Dec. 20, 2004, pp. 1-8.

"International Search Report and Written Opinion Issued in PCT Application No. PCT/US2017/060074", dated Feb. 12, 2018, 10 Pages.

\* cited by examiner

300

WIRELESSLY PROVIDING OPERATING SYSTEM SPECIFIC FEATURES

CROSS-REFERENCE TO RELATED APPLICATIONS

This application claims the benefit of U.S. Patent Provisional Patent Application Ser. No. 62/420,396, filed Nov. 10, 2016, and entitled "WIRELESSLY PROVIDING OPERATING SYSTEM SPECIFIC FEATURES", the application of which is incorporated herein in its entirety by reference.

BACKGROUND

Wireless technologies, such as Bluetooth®, among others, provide an easy and convenient way to wirelessly connect one or more devices to a remote host device. For example, multiple input devices can be connected simultaneously to a remote host device using Bluetooth® without the use of additional adapters or cables.

In some examples, wireless technologies may be designed to be operating system (OS) agnostic. For example, regardless of the operating system being run by a host device, the wireless technology may operate using the same commands and functionality. Thus, a wireless keyboard may operate similarly on devices running different operating systems.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for wirelessly providing operating system specific features. The system includes memory and a processor configured to send a device ID (DID) request to a remote host device via a wireless connection. The processor can also be configured to receive remote host information from the remote host device via the wireless connection. The processor can also detect an operating system of the remote host device based on the received remote host information. In some examples, the processor can modify an operation of the system based on the detected operating system of the remote host device. The processor can provide, via the wireless connection, an operating system specific feature based on the detected operating system of the remote host device.

In another embodiment described herein, a method for wirelessly providing operating system specific features includes sending, via a processor, a device ID (DID) request to a remote host device via a wireless connection. The method also includes receiving, via the processor, remote host information from the remote host device via the wireless connection. Additionally, the method includes detecting, via the processor, an operating system of the host remote device based on the received remote host information. The method further include modifying, via the processor, an operation of the system based on the detected operating system of the remote host device. The method also further includes providing, via the processor and the wireless connection, an operating system specific feature based on the detected operating system of the remote host device.

Another implementation provides one or more computer-readable storage medium for storing computer readable instructions that, when executed by one or more processing devices, instruct the wireless provision of operating system specific features. The computer-readable medium includes instructions to send a device ID (DID) request to a remote host device via a wireless connection. The computer-readable medium also includes instructions to receive remote host information from the remote host device via the wireless connection. The computer-readable medium further includes instructions to detect an operating system of the host remote device based on the received remote host information. The computer-readable medium also includes instructions to modify an operation of the system based on the detected operating system of the remote host device. The computer-readable medium also further includes instructions to provide, via the wireless connection, an operating system specific feature based on the detected operating system of the remote host device.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
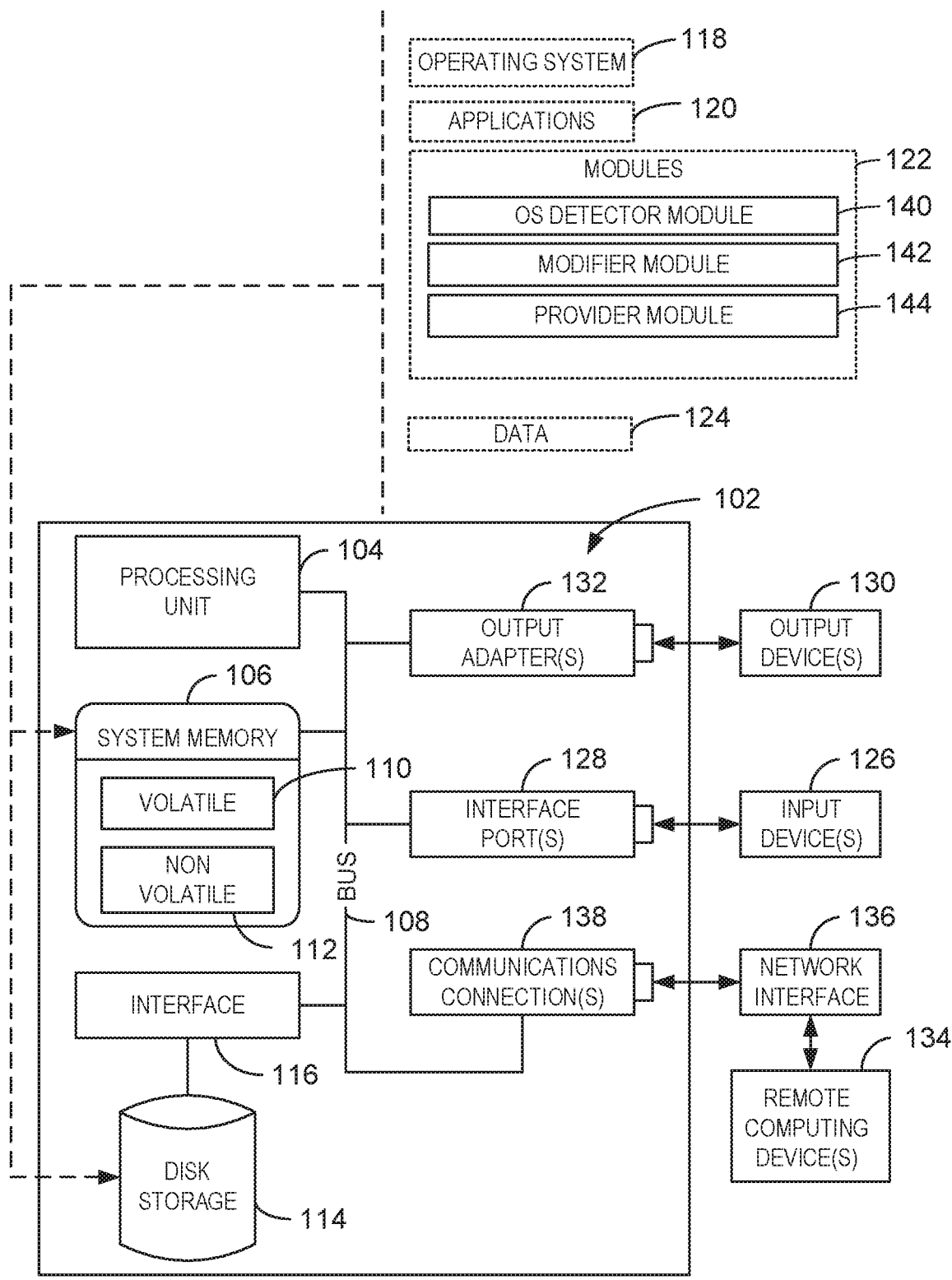
FIG. 1 is a block diagram of an example of a computing system that can wirelessly provide operating system specific features.

As described above, wireless technologies may be designed to be operating system (OS) agnostic. For example, a wireless protocol may not natively support a method for querying the remote OS type. However, there are instances where it may be beneficial to detect the remote OS type, due to behavioral differences across different operating systems. For example, once the remote OS type is known, the device may be able to tailor its operation to be compatible or optimized for the remote device.

Some devices may use a physical switch located on the devices to allow the user to manually switch between OS types. However, this is a manual solution and requires the user to match the switch position with the remote OS type. Moreover, some users may not be able to determine the remote OS type. Some device may include software that is installed as either an application or a driver on a remote device to translate input or to configure the device. For example, the software may be a form of software switch. However, this may require the user to find and install additional software that is used to translate the input.

In embodiments described herein, a system can wirelessly provide operating system specific features based on an automated detection of an operating system of a remote host device. As used herein, the remote host device can be any communications target device. The system described herein can send a device ID (DID) request to a remote host device via a wireless connection. For example, the system and the remote host device are can be wireless devices using a wireless connection that uses any suitable wireless protocol that may operate using ultra high frequency radio waves, very high frequency radio waves (VHF), high frequency radio waves (HF), infrared signals, or any other suitable technique. The system may then receive remote host information from the remote host device via the wireless connection. For example, the remote host information can include a host vendor ID (VID) and a host product ID (PID). The system can then detect an operating system of the host remote device based on the received a host vendor ID (VID) and a host product ID (PID). In some examples, the system can detect the operating system by using a look-up table to detect the remote device OS type based on the received remote host information. The system can also modify an operation of the system based on the detected operating system of the remote host device. The system may then provide, via the wireless connection, an operating system specific feature based on the detected operating system of the remote host device. For example, the processor may provide a HID gamepad key mapping that is compatible with functionality of the OS of the remote host device via a wireless connection. Thus, the present techniques enable operating system specific features to be sent and received between the system and the remote host device wirelessly. Moreover, the system may detect the operating system used by the remote host device automatically and without any user input.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can wirelessly provide operating system specific features. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/nonvolatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). For example, a wireless LAN can include a Bluetooth® network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, Bluetooth® controllers, and Ethernet cards.

The computer 102 includes one or more modules 122, such as an operating system (OS) detector module 140, a modifier module 142, and a provider module 144. The OS detector module 140 can send a device identifier (DID) request to a remote host device via a wireless connection. For example, the OS detector module 140 can send the DID request to the remote host device in response to receiving a connection request from the remote host device. In some examples, the wireless connection may be a connection using any suitable wireless protocol that may operate using ultra high frequency radio waves, very high frequency radio waves (VHF), high frequency radio waves (HF), infrared signals, or any other suitable technique. The OS detector module 140 can also receive remote host information from the remote host device via the wireless connection. For example, the remote host information can include a host vendor identifier (VID) and a host product identifier (PID). In some examples, the OS detector module 140 can receive the remote host information including the host vendor identifier (VID) and the host product identifier (PID) in response to the DID request. In some examples, a combination of the host VID and host PID may be used to identify the manufacturer of a wireless host stack of the remote host device. The OS detector module 140 can then detect an operating system of the host remote device based on the received remote host information. In some examples, the modifier module 142 can modify an operation of the system based on the detected operating system of the remote host device. For example, the modifier module 142 can switch a human interface device (HID) gamepad key mapping based on the OS type detected on the remote device. In some examples, the OS detector module 140 can receive a pairing request from the remote host device. The OS detector module 140 can delay accepting the pairing request until the operation of the system is modified by the modifier module 142. The OS detector module 140 can then accept the pairing request with the remote host device in response to detecting that the modifier module 142 has modified the operation of the system.

The provider module 144 can provide, via the wireless connection, an operating system specific feature based on the detected operating system of the remote host device. For example, the provider module 144 can provide an HID gamepad key mapping that is compatible with functionality of the OS of the remote host device.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the OS detector module 140, modifier module 142, and provider module 144, may be partially, or entirely, implemented in hardware and/or in the processor 104. For example, the functionality may be implemented with an application specific integrated circuit, in logic implemented in the processor 104, or in any other device.

Figure 2:
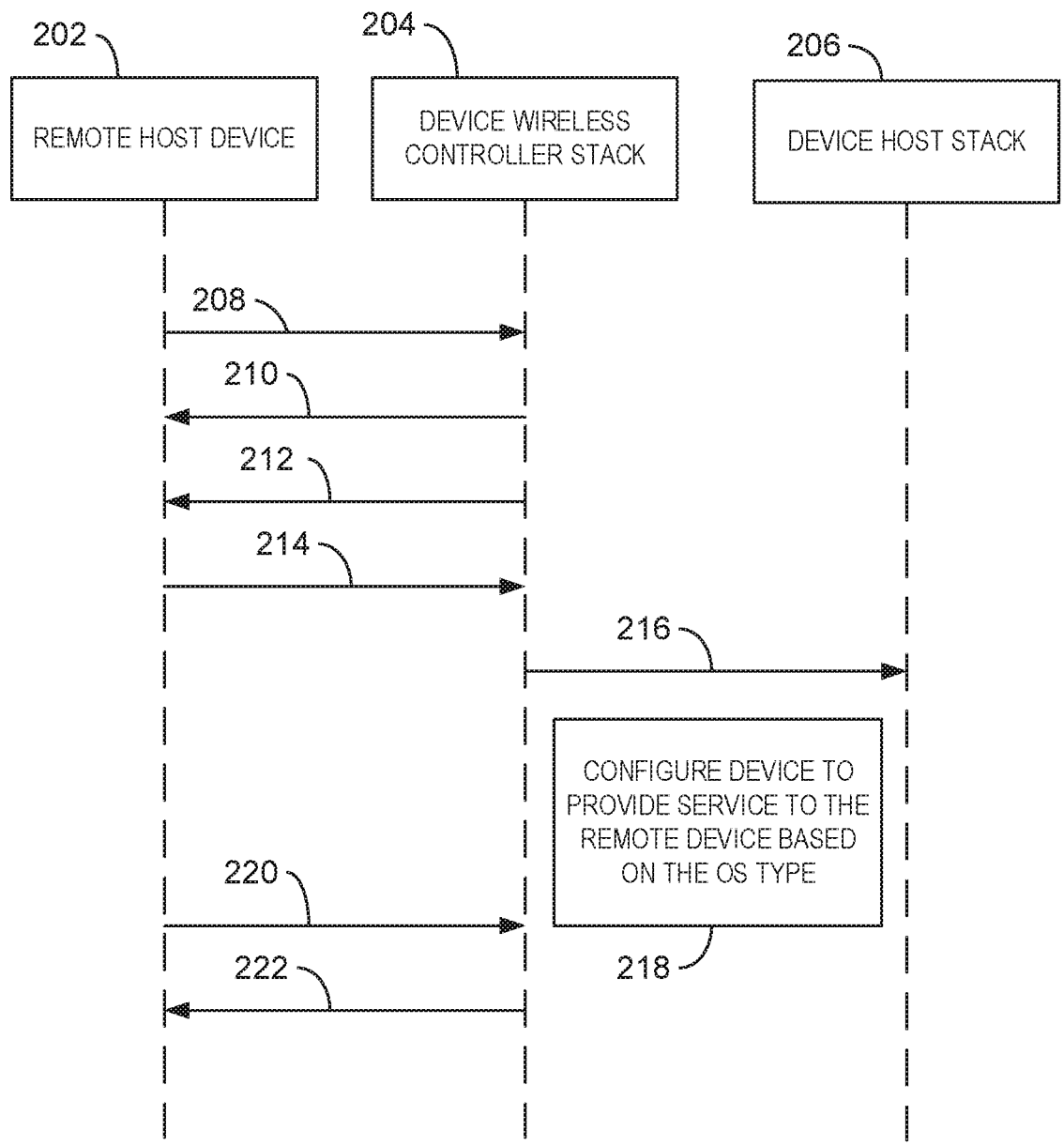
FIG. 2 is a timing diagram of an example process for wirelessly providing operating system specific features.

FIG. 2 is a timing diagram of an example process for wirelessly providing operating system specific features. The process can be implemented with any suitable computing device, such as the computing system 102 of FIG. 1.

The example timing diagram 200 includes a remote host device 202, a device wireless controller stack 204, and a device host stack 206. At time 208, the remote host device 108 sends a connection request to the device wireless controller stack 204 via a wireless connection. For example, the wireless connection can be an ultra-high frequency radio wave protocol connection.

At time 210, the device wireless controller stack 204 accepts the connection request via the wireless connection. For example, the wireless controller stack 204 may accept the connection request by sending an acceptance response.

At time 212, the device wireless controller stack 204 sends a DID request via the wireless connection. For example, the DID request may include a request for remote host information, including a host VID and a host PID. In some examples, the DID request may include a request for any additional software information.

At time 214, the remote host device 202 responds to the DID request by sending remote host information to the device wireless controller stack 204 via the wireless connection. For example, the remote host information may be associated with the remote host device and may include a host vendor identifier (VID) and a host product identifier (PID). In some examples, the remote device 202 may also respond by sending any additional software information requested at time 212.

At time 216, the device wireless controller stack 204 sends the remote host information to the device host stack 206. For example, upon receiving a VID and a PID sent by the remote device, the device will check the look up table to determine the remote device OS type. The device host stack 206 may then configure the device to provide service to the remote device based on a detected operating system type as indicated at block 218. For example, the device may switch HID gamepad key mapping based on the OS type on the remote device. Thus, the device may be able to provide additional features and improved service over standard devices that provide OS agnostic services.

At time 220, the remote host device 202 sends a pairing request to the device wireless controller stack 204 via the wireless connection. In some examples, the pairing request may be received by the device host stack 206 before the device host stack 306 is finished configuring the device.

At time 222, the device wireless controller stack 204 accepts the pairing request via the wireless connection. For example, the device wireless controller stack 204 may send a response accepting the pairing request after the configuration process in time 216 and 218 is completed. Thus, in some examples, the device wireless controller stack 204 can delay the acceptance of the pairing request until the system is configured.

The diagram of FIG. 2 is not intended to indicate that the example process 200 is to include all of the components shown in FIG. 2. Rather, the example process 200 can be implemented using fewer or additional components not illustrated in FIG. 2 (e.g., additional remote host devices, wireless controller stacks, device host stacks, etc.). In one embodiment, the process of FIG. 2 is intended to indicate that the steps of the process 200 are to be executed in a particular order. Alternatively, in other embodiments, the steps of the process 200 can be executed in any suitable order and any suitable number of the steps of the process 200 can be included. Further, any number of additional steps may be included within the process 200, depending on the specific application. For example, the remote device 202 may alternatively include operating system information, such as the host VID and host PID, in the connection request of time 208. Thus, the device wireless controller stack 204 may not send a DID request at time 212 nor receive the remote host information including a host VID and a host PID at time 214.

Figure 3:
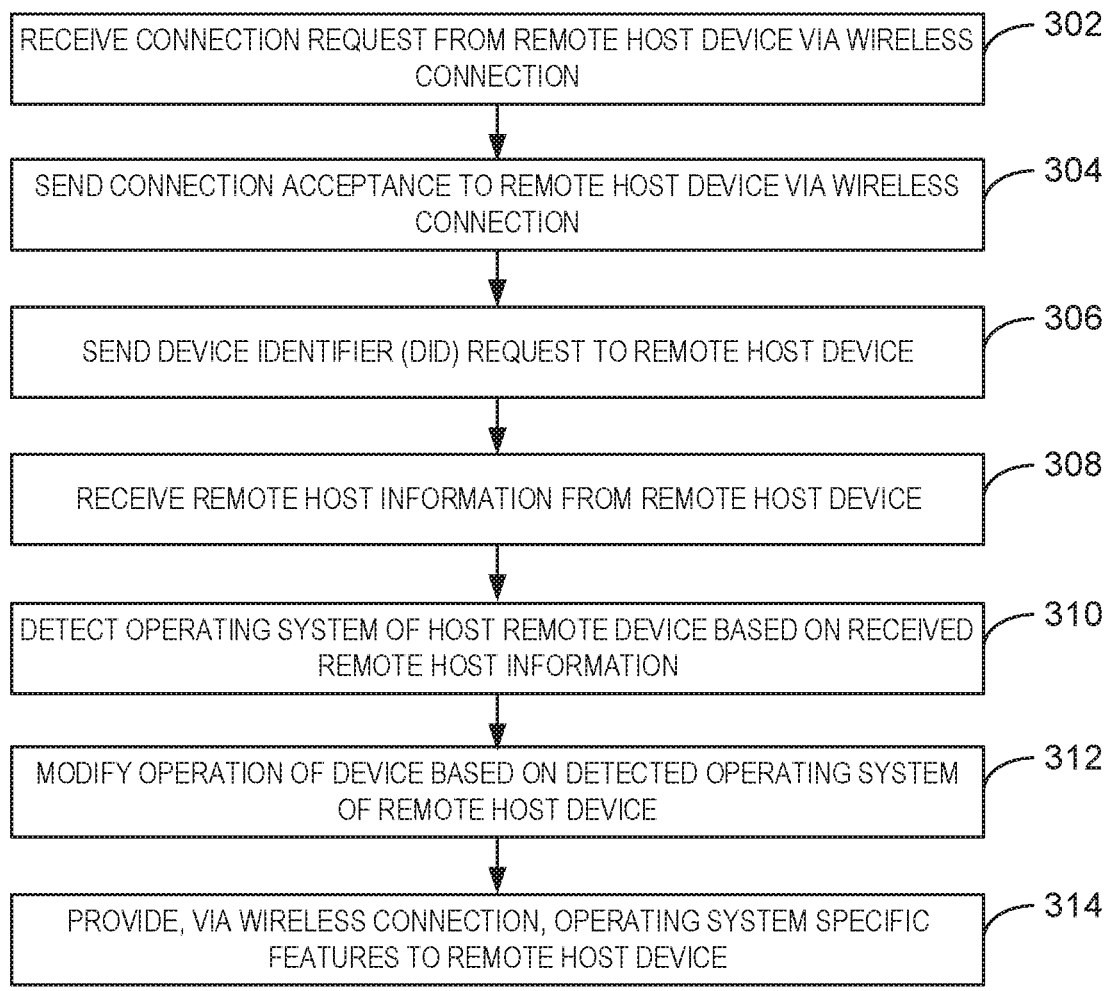
FIG. 3 is a process flow diagram of an example method for wirelessly providing operating system specific features.

FIG. 3 is a process flow diagram illustrating an example method for wirelessly providing operating system specific features. The method 300 can be implemented with any suitable computing device, such as the computing system 102 of FIG. 1.

At block 302, a processor receives a connection request from a remote host device via a wireless connection. In some examples, the wireless connection can be an ultra-high frequency radio wave protocol connection.

At block 304, the processor the processor sends a connection acceptance to the remote host device via the wireless connection. For example, the processor can send the connection acceptance in response to receiving the connection request from the remote host device.

At block 306, the processor sends a device ID (DID) request to a remote host device via a wireless connection. For example, the wireless connection can be an ultra-high frequency radio wave protocol connection. In some embodiments, the processor can send the device identifier request to the remote host device in response to detecting a connection request from the remote host device.

At block 308, the processor receives remote host information from the remote host device via the wireless connection. For example, remote host information can include a host vendor ID (VID) and a host product ID (PID). In some examples, the host VID and host PID may be associated with a particular device having a particular operating system installed thereon. In some examples, the processor may receive the remote host information in response to the DID request.

At block 310, the processor detects an operating system of the host remote device based on the received remote host information. For example, the processor may perform a look-up on a look-up table based on the remote host information as described in greater detail with respect to the example method 400 of FIG. 4 below.

At block 312, the processor modifies an operation of a device based on the detected operating system of the remote host device. For example, the processor can switch a human interface device (HID) gamepad key mapping based on the detected OS of the remote host device. In some examples, the processor may configure a computing device based on the detected OS of the remote host device to provide service to the remote host device based on the OS type. In some examples, the processor can modify the operation of the system based on the device type of the remote host device. For example, the remote host device may be a vehicle system or a mobile phone.

At block 314, the processor provides, via the wireless connection, an operating system specific feature based on the detected operating system of the remote host device. For example, the processor may provide an HID gamepad key mapping that is compatible with functionality of the OS of the remote host device. In some examples, the operating system specific feature may also be based on the device type of the host device. For example, the operating system specific feature may enable a vehicle to offer particular services or a mobile phone to offer a particular service when connected to a vehicle.

In one embodiment, the process flow diagram of FIG. 3 is intended to indicate that the steps of the method 300 are to be executed in a particular order. Alternatively, in other embodiments, the steps of the method 300 can be executed in any suitable order and any suitable number of the steps of the method 300 can be included. Further, any number of additional steps may be included within the method 300, depending on the specific application. For example, the remote device may alternatively include operating system information, such as the host VID and PID, in the connection request at block 302. Thus, in some examples, the processor may not send a DID request at time 212 nor receive the remote host information including a host VID and host PID at block 308.

Figure 4:
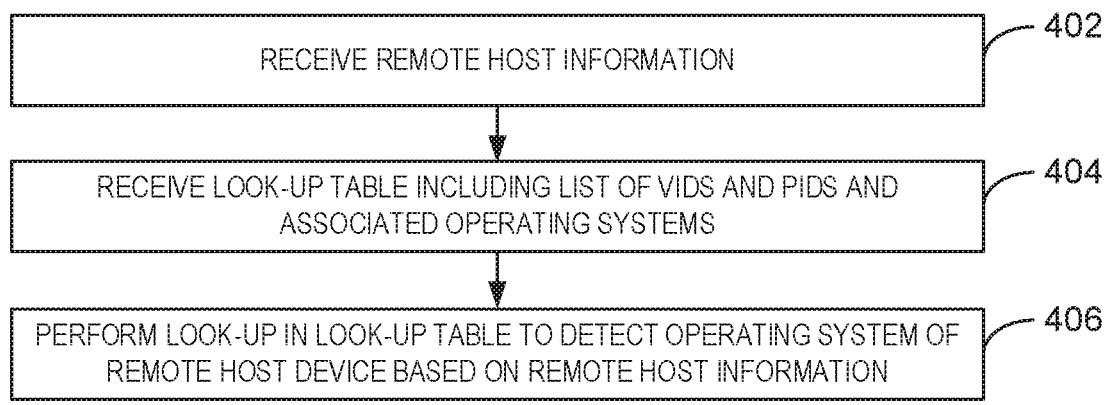
FIG. 4 is a process flow diagram of an example method for detecting an operating system of a host remote device based on a host vendor ID (VID) and host product ID (PID)

FIG. 4 is a process flow diagram illustrating an example method for detecting an operating system of a host remote device based on a host vendor identifier (VID) and host product ID (PID). The method 400 can be implemented with any suitable computing device, such as the computing system 102 of FIG. 1.

At block 402, the processor receives a host vendor VID and a host product identifier PID. In some examples, the processor may have received the host vendor VID and a host product identifier PID from a remote host device as described in FIG. 3 above.

At block 404, the processor receives a look-up table including a list of VIDs and PIDs and associated operating systems. For example, the lookup-table may include a list of devices associated with particular VIDs and PIDs, and the operating systems installed on the devices. In some examples, the look-up table can be included in software for a fixed set of options. In some examples, the look-up table can be hosted as a web service.

At block 406, the processor performs a look-up in the look-up table to detect the operating system of the remote host device based on the host VID and the host PID. For example, the processor can match the host VID and host PID with a particular device and operating system.

In one embodiment, the process flow diagram of FIG. 4 is intended to indicate that the steps of the method 400 are to be executed in a particular order. Alternatively, in other embodiments, the steps of the method 400 can be executed in any suitable order and any suitable number of the steps of the method 400 can be included. Further, any number of additional steps may be included within the method 400, depending on the specific application.

Figure 5:
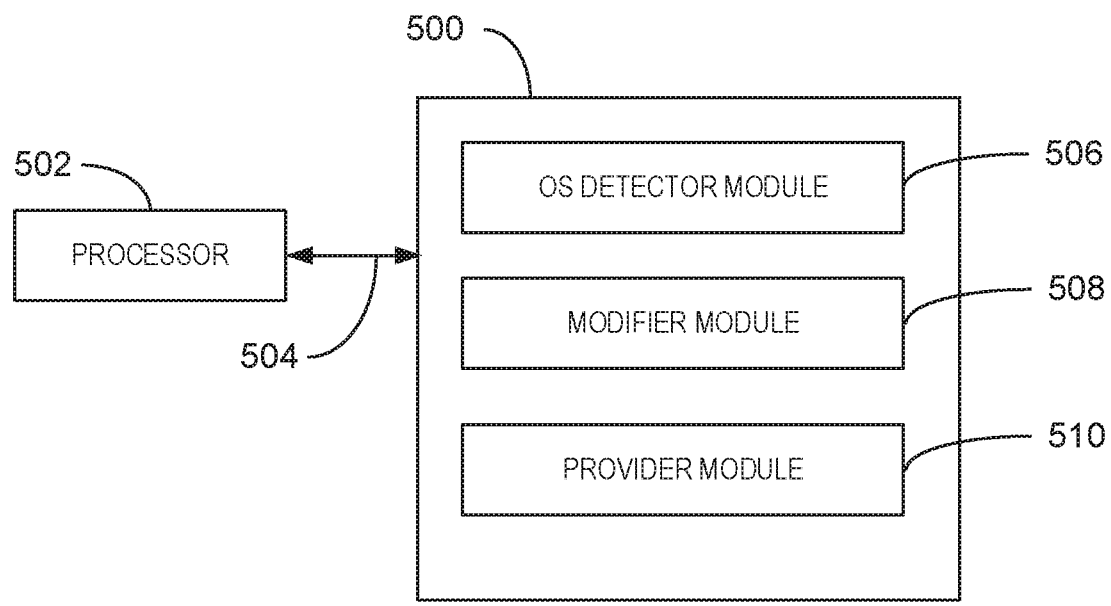
FIG. 5 is a block diagram of an example computer-readable storage media that can wirelessly provide operating system specific features.

FIG. 5 is a block diagram of an example computer-readable storage media that can wirelessly provide operating system specific features. The tangible, computer-readable storage media 500 may be accessed by a processor 502 over a computer bus 504. Furthermore, the tangible, computer-readable storage media 500 may include code to direct the processor 502 to perform the steps of the current methods.

The various software components discussed herein may be stored on the tangible, computer-readable storage media 500, as indicated in FIG. 5. For example, the tangible computer-readable storage media 500 can include an operating system (OS) detector module 506, a modifier module 508, and a provider module 510. In some embodiments, the OS detector module 506 can send a device identifier (DID) request to a remote host device via a wireless connection. The OS detector module 506 can also receive remote host information from the remote host device via the wireless connection. For example, the remote host information can include a host vendor identifier (VID) and a host product identifier (PID). The OS detector module 506 can then detect an operating system of the host remote device based on the received remote host information. For example, the OS detector module 506 can receive a look-up table comprising a list of VIDs and PIDs and associated operating systems. The OS detector module 506 can then perform a look-up in the look-up table to detect the operating system of the remote host device based on the remote host information. For example, the remote host information can include a host VID and a host PID. Thus, the OS detector module 506 can perform a look-up in the look-up table to detect the operating system of the remote host device based on the host VID and the host PID. The modifier module 508 can modify an operation of the system based on the detected operating system of the remote host device. For example, the modifier module 508 can switch a human interface device (HID) gamepad key mapping based on the OS type detected on the remote device. In some examples, the OS detector module 506 can receive a pairing request from the remote host device. The OS detector module 506 can delay acceptance of the pairing request until the operation of the system is modified by the modifier module 508. The OS detector module 506 can then accept the pairing request once the modifier module 508 has finished modifying the operation of the system.

The provider module 510 can provide, via the wireless connection, an operating system specific feature based on the detected operating system of the remote host device. For example, the provider module 510 can provide an HID gamepad key mapping that is compatible with functionality of the OS of the remote host device.

It is to be understood that any number of additional software components not shown in FIG. 5 may be included within the tangible, computer-readable storage media 500, depending on the specific application.

Example 1

This example provides for an example system for wirelessly providing operating system specific features. The example system includes a memory and a processor configured to send a device identifier (DID) request to a remote host device via a wireless connection. The processor can be configured to receive remote host information from the remote host device via the wireless connection. The processor can also be configured to detect an operating system of the remote host device based on the received remote host information. The processor can also be configured to modify an operation of the system based on the detected operating system of the remote host device. The processor can be configured to provide, via the wireless connection, an operating system specific feature based on the detected operating system of the remote host device. Alternatively, or in addition, the processor can send the DID request to the remote host device in response to receiving a connection request from the remote host device and receive the remote host information including a host vendor identifier (VID) and a host product identifier (PID) in response to the DID request. Alternatively, or in addition, the operating system specific feature comprises an HID gamepad key mapping that is compatible with functionality of the operating system of the remote host device. Alternatively, or in addition, the processor can receive a look-up table comprising a list of VIDs and PIDs and associated operating systems. Alternatively, or in addition, the processor can be configured to perform a look-up in the look-up table to detect the operating system of the remote host device based on the remote host information, wherein the remote host information includes a host VID and a host PID. Alternatively, or in addition, the processor can receive a pairing request from the remote host device. The processor can delay accepting the pairing request until the operation of the system is modified. The processor can then accept the pairing request with the remote host device in response to detecting that the operation of the system is modified. Alternatively, or in addition, the processor is to use a combination of a host VID and a host PID from the remote device information to identify a manufacturer of a wireless host stack of the remote host device. Alternatively, or in addition, the system and the remote host device can be devices that are to execute an ultra-high frequency radio wave protocol.

Example 2

This example provides for a method for providing operating system specific features. The example method includes sending, via a processor, a device identifier (DID) request to a remote host device via a wireless connection. The method also includes receiving, via the processor, remote host information from the remote host device via the wireless connection. The method further also includes detecting, via the processor, an operating system of the host remote device based on the received remote host information. The method further also includes modifying, via the processor, an operation of a device based on the detected operating system of the remote host device. The method further also includes providing, via the processor and the wireless connection, an operating system specific feature based on the detected operating system of the remote host device. Alternatively, or in addition, the method can also include receiving a connection request from the remote host device and sending the DID in response to receiving the connection request and receiving the remote host information including a host vendor identifier (VID) and a host product identifier (PID) in response to the DID request. Alternatively, or in addition, the method can also include receiving, via the processor, a look-up table comprising a list of VIDs and PIDs and associated operating systems and performing, via the processor, a look-up in the look-up table to detect the operating system of the remote host device based on the remote host information, wherein the remote host information include a host VID and a host PID. Alternatively, or in addition, modifying the operation of the system can include switching a human interface device (HID) gamepad key mapping. Alternatively, or in addition, providing the operating system specific feature can include providing an HID gamepad key mapping that is compatible with functionality of the OS of the remote host device. Alternatively, or in addition, the method can also include receiving a pairing request from the remote host device via the wireless connection, delaying acceptance of the pairing request until the operation of the system is modified, and accepting the pairing request via the wireless connection. Alternatively, or in addition, the method can also include configuring a computing device based on the detected OS of the remote host device to provide service to the remote host device based on the OS type. Alternatively, or in addition, the wireless connection an ultra-high frequency radio wave protocol connection.

Example 3

This example provides for an example computer-readable storage device for wirelessly providing operating system specific features. The example computer-readable storage device includes executable instructions that can be executed by a processor to cause the processor to send a device identifier (DID) request to a remote host device via a wireless connection. The executable instructions can be executed by the processor to receive remote host information from the remote host device via the wireless connection. The executable instructions can be executed by the processor to detect an operating system of the host remote device based on the received remote host information. The executable instructions can be executed by the processor to modify an operation of the system based on the detected operating system of the remote host device. The executable instructions can be executed by the processor to provide, via the wireless connection, an operating system specific feature based on the detected operating system of the remote host device. Alternatively, or in addition, the executable instructions can be executed by the processor to receive a pairing request from the remote host device, delay acceptance of the pairing request until the operation of the system is modified, and accept the pairing request. Alternatively, or in addition, the executable instructions can be executed by the processor to receive a look-up table comprising a list of VIDs and PIDs and associated operating systems and perform a look-up in the look-up table to detect the operating system of the remote host device based on the remote host information, wherein the remote host information includes a host VID and a host PID. Alternatively, or in addition, the executable instructions can be executed by the processor to switch a human interface device (HID) gamepad key mapping based on the OS type detected on the remote device. Alternatively, or in addition, the executable instructions can be executed by the processor to provide a human interface device (HID) gamepad key mapping that is compatible with functionality of the OS of the remote host device.

Example 4

This example provides for an example system for wirelessly providing operating system specific features. The example system includes means for sending a device identifier (DID) request to a remote host device via a wireless connection. The system includes means for receiving remote host information from the remote host device via the wireless connection. The system includes means for detecting an operating system of the remote host device based on the received remote host information. The system includes means for modifying an operation of the system based on the detected operating system of the remote host device. The system includes means for providing, via the wireless connection, an operating system specific feature based on the detected operating system of the remote host device. Alternatively, or in addition, the system can include means for sending the DID request to the remote host device in response to receiving a connection request from the remote host device and means for receiving the remote host information including a host vendor identifier (VID) and a host product identifier (PID) in response to the DID request. Alternatively, or in addition, the operating system specific feature comprises an HID gamepad key mapping that is compatible with functionality of the operating system of the remote host device. Alternatively, or in addition, the system can include means for receiving a look-up table comprising a list of VIDs and PIDs and associated operating systems. Alternatively, or in addition, the system can include means for performing a look-up in the look-up table to detect the operating system of the remote host device based on the remote host information, wherein the remote host information includes a host VID and a host PID. Alternatively, or in addition, the system can include means for receiving a pairing request from the remote host device, delaying acceptance of the pairing request until the operation of the system is modified, and accepting the pairing request with the remote host device in response to detecting that the operation of the system is modified. Alternatively, or in addition, the system can include means for identifying a manufacturer of a wireless host stack of the remote host device using a combination of a host VID and a host PID from the remote host information. Alternatively, or in addition, the system and the remote host device can be devices that execute an ultra-high frequency radio wave protocol.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for wirelessly providing operating system specific features, the system comprising:
   memory; and
   a processor configured to:
      send a device identifier (DID) request to a remote host device via a wireless connection;
      receive remote host information from the remote host device via the wireless connection;
      detect an operating system of the remote host device based on the received remote host information;
      modify an operation of the system to be compatible with a functionality of the detected operating system of the remote host device before pairing the system with the remote host device; and
      accept a pairing request from the remote host device in response to detecting that the operation of the system is modified.

2. The system of claim 1, wherein the processor is to send the DID request to the remote host device in response to receiving a connection request from the remote host device and receive the remote host information comprising a host vendor identifier (VID) and a host product identifier (PID) in response to the DID request.

3. The system of claim 1, wherein modifying the operation of the system comprises selecting a human interface device (HID) gamepad key mapping that is compatible with the functionality of the detected operating system of the remote host device.

4. The system of claim 1, wherein the processor is to:
   receive a look-up table comprising a list of host vendor identifiers (VIDs) and host product identifiers (PI Ds) and associated operating systems; and
   perform a look-up in the look-up table to detect the operating system of the remote host device based on the remote host information, wherein the remote host information comprises a host VID and a host PID.

5. The system of claim 1, wherein the processor is to receive the pairing request from the remote host device and delay accepting the pairing request until the operation of the system is modified.

6. The system of claim 1, wherein the processor is to use a combination of a host vendor identifier (VID) and a host product identifier (PID) from the remote host information to identify a manufacturer of a wireless host stack of the remote host device, the processor to detect the operating system based on the identified manufacturer of the wireless host stack.

7. The system of claim 1, wherein the system and the remote host device comprise devices that are to execute an ultra-high frequency radio wave protocol.

8. The system of claim 1, comprising providing an operating system specific feature based on the detected operating system and a device type of the remote host device, wherein the operating system specific feature enables a mobile device to offer a particular service when connected to a vehicle as the remote host device.

9. A method for wirelessly providing operating system specific features, comprising:
   sending, via a processor, a device identifier (DID) request to a remote host device via a wireless connection;
   receiving, via the processor, remote host information from the remote host device via the wireless connection;
   detecting, via the processor, an operating system of the remote host device based on the received remote host information;
   modifying, via the processor, an operation of a second device to be compatible with a functionality of the detected operating system of the remote host device; and
   accepting, via the processor, a pairing request from the remote host device in response to detecting that the operation of the second device is modified.

10. The method of claim 9, comprising receiving a connection request from the remote host device and sending the DID request in response to receiving the connection request and receiving the remote host information comprising a host vendor identifier (VID) and a host product identifier (PID) in response to the DID request.

11. The method of claim 9, comprising:
    receiving, via the processor, a look-up table comprising a list of host vendor identifiers (VIDs) and host product identifiers (PIDs) and associated operating systems; and
    performing, via the processor, a look-up in the look-up table to detect the operating system of the remote host device based on the remote host information, wherein the remote host information comprises a host vendor identifier (VID) and a host product identifier (PID).

12. The method of claim 9, wherein modifying the operation of the second device comprises switching a human interface device (HID) gamepad key mapping.

13. The method of claim 9, wherein modifying the operation of the second device comprises selecting a human interface device (HID) gamepad key mapping that is compatible with the functionality of the detected operating system (OS) of the remote host device.

14. The method of claim 9, comprising receiving the pairing request from the remote host device via the wireless connection, delaying acceptance of the pairing request until the operation of the second device is modified, and accepting the pairing request via the wireless connection.

15. The method of claim 9, comprising configuring a computing device based on the detected operating system (OS) of the remote host device to provide service to the remote host device based on a type of the OS.

16. The method of claim 9, wherein the wireless connection comprises an ultra-high frequency radio wave protocol connection.

17. One or more computer-readable memory storage devices for storing computer-readable instructions that, when executed by one or more processing devices, wirelessly provide operating system specific features, the computer-readable instructions comprising code to:
    send a device identifier (DID) request to a remote host device via a wireless connection;
    receive remote host information from the remote host device via the wireless connection;
    detect an operating system of the remote host device based on the received remote host information;
    modify an operation of a second device to be compatible with a functionality of the detected operating system of the remote host device; and
    accept a pairing request from the remote host device in response to detecting that the operation of the second device is modified.

18. The one or more computer-readable memory storage devices of claim 17, the computer-readable instructions comprising code to receive the pairing request from the remote host device, delay acceptance of the pairing request until the operation of the second device is modified, and accept the pairing request.

19. The one or more computer-readable memory storage devices of claim 17, the computer-readable instructions comprising code to:
   receive a look-up table comprising a list of host vendor identifiers (VIDs) and host product identifiers (PI Ds) and associated operating systems; and
   perform a look-up in the look-up table to detect the operating system of the remote host device based on the remote host information, wherein the remote host information comprises a host VID and a host PID.

20. The one or more computer-readable memory storage devices of claim 17, the computer-readable instructions comprising code to switch a human interface device (HID) gamepad key mapping based on a type of the operating system (OS) detected on the remote host device.

21. The one or more computer-readable memory storage devices of claim 17, the computer-readable instructions comprising code to provide a human interface device (HID) gamepad key mapping that is compatible with the functionality of the detected operating system (OS) of the remote host device.

* * * * *